United States Patent
Schulz

(10) Patent No.: US 7,419,147 B2
(45) Date of Patent: Sep. 2, 2008

(54) DEVICE FOR BLOCKING A SUSPENSION STRUT OF A MOTOR VEHICLE

(75) Inventor: Achim Schulz, Niefern-Öschelbrunn (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 0 days.

(21) Appl. No.: 11/805,877

(22) Filed: May 24, 2007

(65) Prior Publication Data

US 2007/0278728 A1 Dec. 6, 2007

(30) Foreign Application Priority Data

May 24, 2006 (DE) .................. 10 2006 024 268

(51) Int. Cl.
*B60G 11/00* (2006.01)
*B60G 17/005* (2006.01)

(52) U.S. Cl. ................. 267/287; 280/124.154

(58) Field of Classification Search ........... 267/220, 267/166, 286, 287, 33, 169, 178, 179; 280/124.154
See application file for complete search history.

(56) References Cited

U.S. PATENT DOCUMENTS 2,760,772 A * 8/1956 McIntyre ................ 267/255
2,829,883 A * 4/1958 Copeland ................ 267/287
3,141,661 A * 7/1964 Melton et al. ............ 267/287
3,591,161 A   7/1971 Scheublein, Jr. et al.
3,773,309 A * 11/1973 Carter .................... 267/287
3,866,896 A * 2/1975 Wehner ................. 267/287
4,529,179 A * 7/1985 Seyler .................... 267/287
6,186,488 B1   2/2001 Lauer

FOREIGN PATENT DOCUMENTS

| DE | 197 51 215 C1 | 12/1998 |
| DE | 200 21 481 U1 | 6/2001 |
| DE | 201 12 593 U1 | 10/2001 |
| DE | 202 15 950 U1 | 1/2003 |
| DE | 103 34 034 B3 | 10/2004 |
| EP | 1 498 636 A2 | 1/2005 |
| JP | 6-81886 | 3/1994 |

* cited by examiner

*Primary Examiner*—Christopher P Schwartz

(57) ABSTRACT

A blocking device for blocking a suspension strut of a motor vehicle for transportation of the motor vehicle. The suspension strut has a damper device and a helical spring. The helical spring is arranged between two spring plates and embraces at least one axial section of the damper device. The blocking device has a spacer body which is of substantially C-shaped design and can be fitted between the two spring plates to the damper device in a manner embracing an axial section on the latter.

10 Claims, 1 Drawing Sheet

DEVICE FOR BLOCKING A SUSPENSION STRUT OF A MOTOR VEHICLE

CROSS-REFERENCE TO RELATED APPLICATION

This application claims the priority, under 35 U.S.C. § 119, of German application DE 10 2006 024 268.8-12, filed May 24, 2006; the prior application is herewith incorporated by reference in its entirety.

BACKGROUND OF THE INVENTION

Field of The Invention

The present invention relates to a device for blocking a suspension strut of a motor vehicle for transportation of the motor vehicle. The suspension strut has a damper device and a helical spring and the helical spring is arranged between two spring plates and embraces at least one axial section of the damper device.

During the transportation of vehicles, it is customary to interrupt the spring action of the suspension struts by, for example, spacer elements being clamped between the individual turns of the spring of the suspension strut and, as a result, limiting the spring travel thereof.

Commonly assigned German patent DE 197 51 215 C1 and its counterpart U.S. Pat. No. 6,186,488 B1 disclose a device for blocking a spring in a suspension strut, wherein device a spacer element is provided for the transportation of a vehicle. In this case, the spacer element comprises at least one segment which can be clipped into the spring, is composed of a hard flexible plastic and is supported at its lower, free end on a spring plate of the suspension strut. In this case, clipping into the turns of the spring takes place into one or more bearing receptacles of the segment to the effect that an upper receptacle serves as the insertion receptacle and the segment is pivoted about this mounting onto the positionally fixed spring plate of the suspension strut and is supported thereon.

A further device for blocking a suspension strut is disclosed, for example, in U.S. Pat. No. 3,591,161.

SUMMARY OF THE INVENTION

It is accordingly an object of the invention to provide a device for blocking a spring strut of a motor vehicle which overcomes the above-mentioned disadvantages of the heretofore-known devices and methods of this general type.

With the foregoing and other objects in view there is provided, in accordance with the invention, a blocking device for blocking a suspension strut of a motor vehicle for transportation of the motor vehicle. The suspension strut includes a damper device and a helical spring, the helical spring being arranged between two spring plates and embracing at least one axial section of the damper device. The novel blocking device comprises a substantially C-shaped spacer body configured for fitting to the damper device between the two spring plates and embracing the damper device in the axial section.

The present invention is based on the general concept of providing spacer bodies in a device of the type in question for blocking a suspension strut of a motor vehicle, said spacer bodies being of essentially C-shaped design and, when the device is fitted to the suspension strut, being arranged radially within a helical spring of the suspension strut and, by means of their C-shaped configuration, embracing an axial section of a damper device of the suspension strut. In this case, the device can have a plurality of spacer bodies which are arranged next to one another in the axial direction of the suspension strut and, as a result, permit a precise limitation of the maximum available spring travel. The helical spring of the suspension strut is usually arranged between two spring plates and embraces or encircles at least one axial section of the damper device. The solution according to the invention makes it possible to limit the suspension strut in respect of its spring travel in a simple manner by corresponding spacer bodies being pushed between the individual turns of the helical spring and subsequently being brought into engagement with the damper device.

A height of a spacer body is expediently smaller than a clear width between two turns of the helical spring in the axial direction of the same in the neutral position of the suspension strut. This permits easy radial insertion of the spacer bodies through the spacings remaining between the turns of the helical spring, as a result of which it proves particularly simple to install the spacer bodies on the suspension strut.

In an advantageous embodiment of the solution according to the invention, the device has a gripping element which is arranged on the spacer body and, when the device is fitted to the suspension strut, protrudes radially outward through the helical spring. A gripping element of this type, which is designed, for example, in the form of a loop or a tear-off tab, facilitates the removal of the spacer body after transportation of the vehicle and obviates the need for a complicated and manually difficult reaching through the spacings between the individual turns of the helical spring. At the same time, a gripping element of this type permits easy handling of the spacer body, thus simplifying the handling thereof also when it is not fitted.

The spacer body is expediently formed from plastic. A spacer body formed from plastic can be produced in virtually any desired shape and, in addition, can be produced cost-effectively. At the same time, by influencing the material properties of the plastic, influence can be exerted on the elasticity of the plastic and therefore on the maximum permissible spring travel.

In a further advantageous embodiment of the solution according to the invention, the spacer body is designed such that it can be stacked axially, with it furthermore being conceivable that it can be stacked in an interlocking manner. Such interlocking stackability firstly facilitates the storage of the spacer bodies when they are not in use and secondly ensures exact positioning of the spacer bodies on the suspension strut in the fitted state. Interlocking stackability can be achieved, for example, via a corresponding, complementary design of mutually facing sides of the spacer bodies.

In a particularly preferred embodiment of the solution according to the invention, the C-shaped spacer body is designed in such a manner that it embraces the axial section of the damper device by more than 180°. This brings about a self-securing position of the spacer body on the axial section of the damper device and ensures that the spacer bodies are reliably held on the suspension strut during transportation of the motor vehicle.

Further important features and advantages of the invention emerge from the subclaims, from the drawings and from the associated description of the figures with reference to the drawings.

It goes without saying that the features mentioned above and the features which have yet to be explained below can be used not only in the respectively stated combination but also in other combinations or on their own without departing from the scope of the present invention.

Other features which are considered as characteristic for the invention are set forth in the appended claims.

Although the invention is illustrated and described herein as embodied in a Device for blocking a suspension strut of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
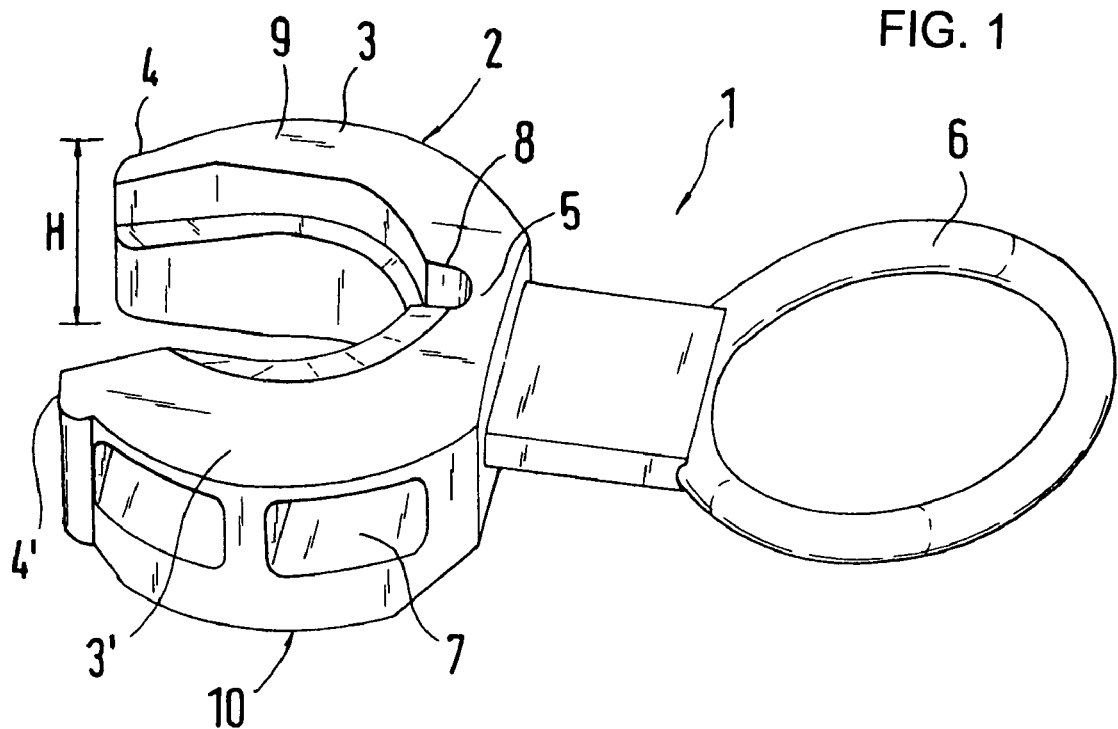
FIG. 1 is a perspective view of a spacer body according to the invention.

Referring now to the figures of the drawing in detail and first, particularly, to FIG. 1 thereof, a spacer body 1 according to the invention has a section 2 of C-shaped design. The C-shaped section 2 is preferably designed in such a manner that its two C-limbs 3, 3' are slightly directed towards each other at their free ends 4, 4'. This makes it possible for them to embrace a damper device (cf. FIG. 2), which is inserted between the two C-limbs 3, 3', by more than 180°. The two C-limbs 3, 3' are connected to each other via a connecting region 5. A gripping element 6, or handle 6, is connected on an outside of the connecting region 5. The gripping element 6 is designed here, for example, as a ring or as a tear-off tab and is preferably formed integrally with the spacer body 1. The gripping element 6 may be arranged eccentrically with respect to the height H of the spacer body 1, which facilitates installation on a suspension strut 13. A notch 8 which is oriented substantially orthogonally to the two C-limbs 3 and 3' is provided on an inside of the connecting region 5 and serves to improve the resilient properties of the two C-limbs 3, 3'. In this case, the two C-limbs 3, 3' can be moved all the more easily towards each other or away from each other, the deeper the notch 8 projects into the connecting region 5. Furthermore, the spacer body 1 has recesses 7 on the outside which influence the elasticity of the spacer body 1 in accordance with their respective size.

In principle, the spacer body 1 is formed from plastic, in particular from flexible plastic, and, as a result, can be produced cost-effectively and in virtually any desired shape in a simple manner. At the same time, influence can thereby be exerted on the elasticity of the plastic via the material properties thereof.

As can furthermore be gathered from FIG. 1, an upper side 9 of the spacer body 1 is of truncated design and preferably has a shape which is complementary to a lower side 10 of the spacer body 1. This permits interlocked stacking of a plurality of spacer bodies 1 above one another (cf. FIG. 2). The height H of the spacer body 1 is preferably approx. 20 to 25 mm and is always smaller than the clear width W between two turns 11 of a helical spring 12 of the suspension strut 13 illustrated in FIG. 2. In general, the spacer body 1 is part of a device for blocking the suspension strut 13, the suspension strut 13 being arranged on a motor vehicle. The blocking of the suspension strut 13 is required here during transportation of the motor vehicle.

Figure 2:
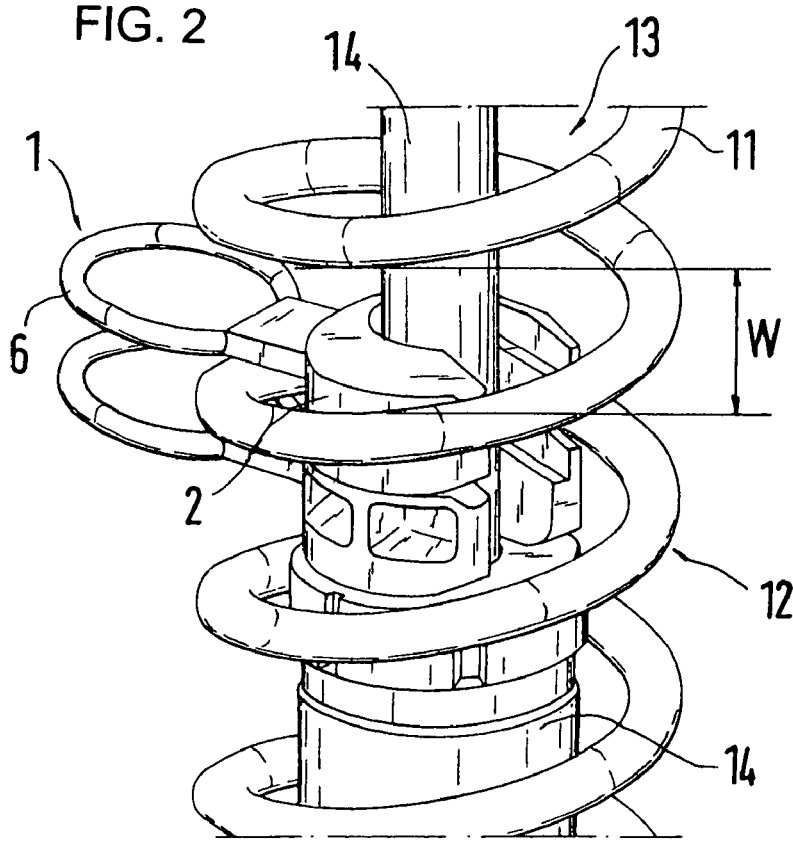
FIG. 2 is a partial perspective view of a suspension strut and two spacer bodies according to the invention installed in, and blocking, the suspension strut.

As illustrated in FIG. 2, the suspension strut 13 has a damper device 14 and the above-mentioned helical spring 12. The damper device 14 may be designed, for example, as a shock absorber. The helical spring 12 is disposed between two non-illustrated spring plates and embraces or encloses at least a partial region of the damper device 14. The damper device 14 is therefore arranged radially within the helical spring 12. As FIG. 2 furthermore shows, two spacer bodies 1 are connected to the axial section of the damper device 14 in such a manner that the C-shaped section 2 of the spacer body 1 embraces said axial section of the damper device 14. When the device is fitted to the suspension strut 13, the gripping element 6 protrudes radially outward through the helical spring 12, and therefore removal or fitting of the spacer bodies 1 is possible in a simple and easy manner. When looking at FIG. 2, it is also clear why the height H of the spacer body 1 should always be smaller than the clear width W between two turns 11 of the helical spring 12 such that the spacer body 1 can be moved between the turns 11.

By means of the mutually complementary design of the upper side 9 and lower side 10 of the spacer body 1, a plurality of spacer bodies 1 can be arranged on the suspension strut 13 in a simple manner, as a result of which the desired blocking of the suspension strut 13 can be achieved.

Of course, it is also conceivable for individual spacer bodies 1 of different height H to have different markings or colors, as a result of which rapid visual checking of the device, which is put together correctly or incorrectly, for blocking the suspension strut 13 is possible.

I claim:

1. A blocking device for blocking a suspension strut of a motor vehicle for transportation of the motor vehicle,
    the suspension strut including a damper device and a helical spring, the helical spring embracing at least one axial section of the damper device; and
    the blocking device comprising a substantially C-shaped spacer body configured for fitting to the damper device in the axial section and embracing the damper device in the axial section, and a gripping element formed on said spacer body, said gripping element protruding radially outward through the helical spring when the blocking device is fitted to the suspension strut.

2. The device according to claim 1, wherein the helical spring is formed with turns defining a clear width therebetween in an axial direction, and said spacer body has a height smaller than the clear width between two turns of the helical spring in a neutral position of the suspension strut.

3. The device according to claim 2, wherein the height of said spacer body, measured in the axial direction of the damper device, is between 20 and 25 mm.

4. The device according to claim 1, wherein said gripping element is a tear-off tab.

5. The device according to claim 1, wherein said gripping element is arranged eccentrically with respect to said spacer body.

6. The device according to claim 1, wherein said spacer body of formed with recesses on an outside thereof.

7. The device according to claim 1, wherein said spacer body is shaped to enable a plurality of spacer bodies to be stacked axially.

8. The device according to claim 1, wherein said spacer body is shaped to enable a plurality of spacer bodies to be stacked in an interlocking manner.

9. The device according to claim 1, wherein said spacer body is formed with two C-limbs and a notch oriented orthogonally to said two C-limbs and arranged in between said C-limbs.

10. The device according to claim 1, wherein said C-shaped spacer body is shaped to embrace the axial section of the damper device by more than 180°.

* * * * *